United States Patent
Kim et al.

(10) Patent No.: US 10,861,298 B2
(45) Date of Patent: Dec. 8, 2020

(54) ADAPTIVE VIBRATION NOISE REDUCTION

(71) Applicant: Motorola Mobility LLC, Chicago, IL (US)

(72) Inventors: Seungho L. Kim, Vernon Hills, IL (US); John J. Gorsica, Round Lake, IL (US); Eric J. Hefner, Lombard, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/141,463

(22) Filed: Sep. 25, 2018

(65) Prior Publication Data

US 2019/0035236 A1 Jan. 31, 2019

Related U.S. Application Data

(62) Division of application No. 15/664,887, filed on Jul. 31, 2017, now abandoned.

(51) Int. Cl.
| | |
|---|---|
| *G08B 6/00* | (2006.01) |
| *H04M 19/04* | (2006.01) |
| *H04R 29/00* | (2006.01) |
| *H04R 3/00* | (2006.01) |
| *H04M 1/725* | (2006.01) |

(52) U.S. Cl.
CPC ............ *G08B 6/00* (2013.01); *H04M 19/047* (2013.01); *H04R 3/005* (2013.01); *H04R 29/00* (2013.01); *H04M 1/72569* (2013.01); *H04R 2410/05* (2013.01); *H04R 2499/11* (2013.01)

(58) Field of Classification Search
CPC .......... G08B 6/00; H04R 3/005; H04R 29/00; H04R 2499/11; H04R 2410/05; H04M 19/047; H04M 1/72569
See application file for complete search history.

(56) References Cited

U.S. PATENT DOCUMENTS

| | | | | |
|---|---|---|---|---|
| 2012/0286943 | A1* | 11/2012 | Rothkopf | G08B 6/00 340/407.1 |
| 2013/0335217 | A1* | 12/2013 | Pakula | H04M 19/04 340/517 |
| 2014/0218183 | A1* | 8/2014 | Van Schyndel | G06F 3/016 340/407.1 |
| 2014/0253302 | A1* | 9/2014 | Levesque | G06F 3/016 340/407.1 |
| 2015/0298169 | A1* | 10/2015 | VanBlon | H04M 19/047 367/138 |

* cited by examiner

*Primary Examiner* — Brian Wilson
(74) *Attorney, Agent, or Firm* — McKinney Phillips LLC; Phillip Pippenger

(57) ABSTRACT

A portable electronic device provides adaptive vibration noise reduction by generating a user alert vibration that is one of a first magnitude and a second magnitude, with the first magnitude being greater than the second magnitude. The portable device is configured to alert the user by providing a first magnitude alert vibration except when the device is lying flat and ambient noise at the device is low, and to provide a second magnitude alert vibration when the device is lying flat and ambient noise at the device is low.

11 Claims, 6 Drawing Sheets

ADAPTIVE VIBRATION NOISE REDUCTION

CROSS-REFERENCE TO RELATED APPLICATIONS

This application is a divisional application of co-pending U.S. patent application Ser. No. 15/664,887 filed on Jul. 31, 2017, entitled, "Adaptive Vibration Noise Reduction", of which is expressly incorporated herein by reference in its entirety.

TECHNICAL FIELD

The present disclosure is related generally to portable electronic devices and, more particularly, to systems and methods for modifying an alert action of a device to reduce excessive noise.

BACKGROUND

Portable electronic devices are now a necessary part of everyday life for many people, and such devices often need to alert their users. For example, a user may be alerted to an incoming email, text or call, or they may be alerted to a calendar appointment or other anticipated or unanticipated event.

Traditionally, alert actions include emitting one or both of a sound alert and a tactile alert. Sound alerts may include one or more tones, such as a ringtone or a bell tone. Tactile alerts typically take the form of a vibration, which the user may perceive by feel. Sometimes, however, tactile alerts may result in audible noise, such as when a device sitting on a hard surface vibrates. Such incidental noise may serve an additional alert function, but its volume may be so high as to be intrusive or disturbing.

Before proceeding to the remainder of this disclosure, it should be appreciated that the disclosure may address some of the shortcomings listed or implicit in this Background section. However, any such benefit is not a limitation on the scope of the disclosed principles, or of the attached claims, except to the extent expressly noted in the claims.

Additionally, the discussion of technology in this Background section is reflective of the inventors' own observations, considerations, and thoughts, and is in no way intended to be, to accurately catalog, or to comprehensively summarize any prior art reference or practice. As such, the inventors expressly disclaim this section as admitted or assumed prior art. Moreover, the identification or implication herein of one or more desirable courses of action reflects the inventors' own observations and ideas, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
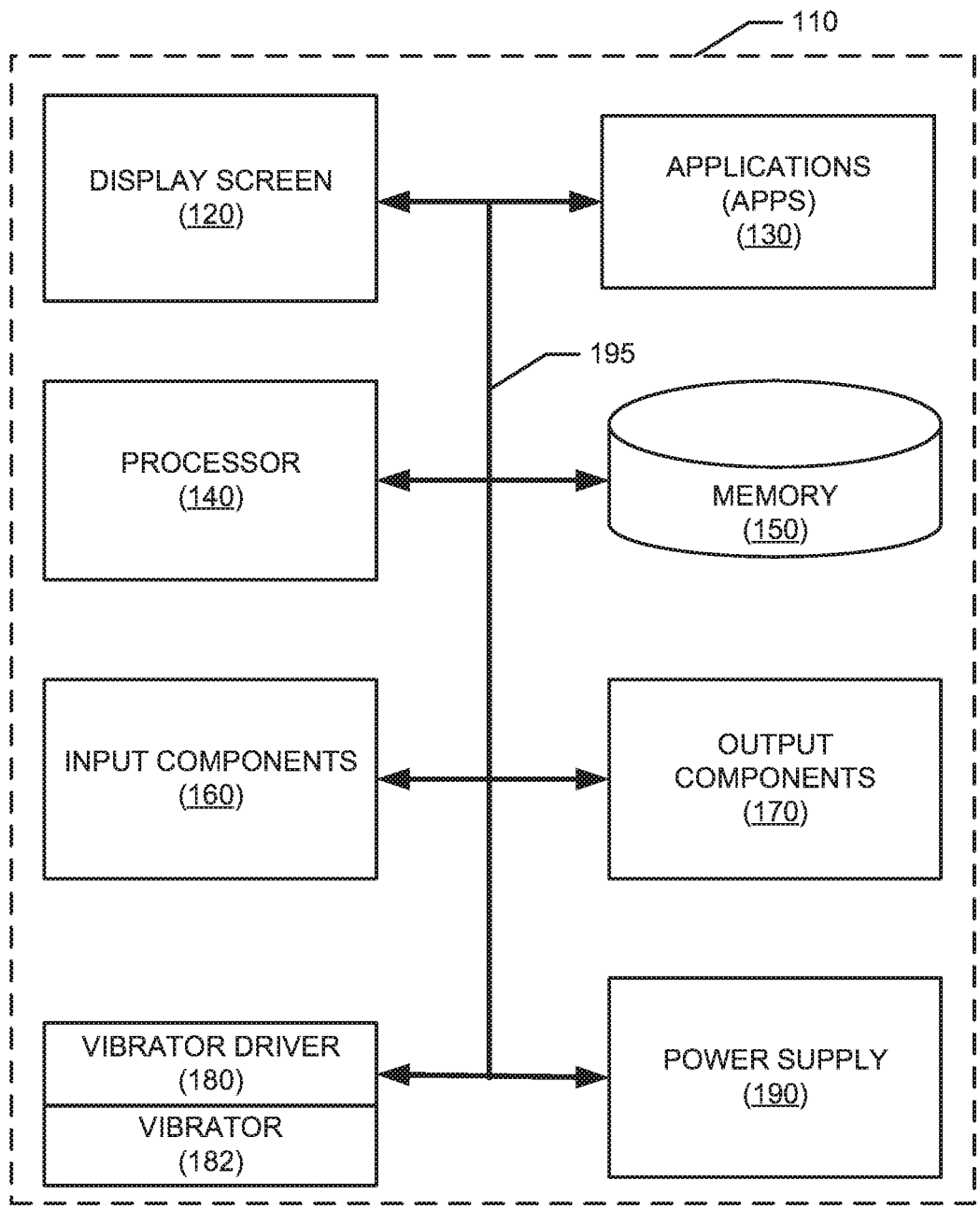
FIG. 1 is a modular view of an example electronic device usable in implementation of one or more embodiments of the disclosed principles.

Before presenting a detailed discussion of embodiments of the disclosed principles, an overview is given to aid the reader in understanding the later discussion. As noted above, portable electronic devices may provide alerts to their users, the alerts being either auditory or vibratory in nature. With respect to vibratory alerts, these alerts can sometimes produce an audible effect that is excessive or unwanted, such as when the device in question is lying on a hard surface.

There are various types of vibrator mechanisms, including, for example, eccentric rotating mass (ERM) vibrators and single axis vibrators on one or more device axes. ERM systems provide good vibration force at a low cost, but do not have a good user feel, and are prone to generate excess noise when the device is laying on a flat surface such as a table top. In addition, vibration frequency and magnitude are directly linked in such systems.

Single axis systems typically comprise one or more linear resonant actuators (LRAs) located along one or more device axes. For LRAs that move in the plane of the device (that is, along the x or y axis or some combination of these), very little resultant vibration force is produced, and the use of both an x axis LRA and y axis LRA may increase device cost. However, such in-plane LRAs do provide adequate alerting action when the device is either in the user's hand or on a flat hard surface.

For LRAs situated to move in the axis perpendicular to the device primary plane (sometimes referred to as the "z" axis), such LRAs provide good vibration force and good user feel at a lower cost than multi-axis LRA systems. However, the performance of the z-axis LRA is compromised by the potential to create unwanted excess noise when an alert occurs while the device is lying flat on a hard surface. Even X-axis or Y-axis LRAs can cause excessive noise if the back of the device is not flat on the surface, due to either the device or the surface not being flat. An example would be a curved back phone with x-axis motor rocking loudly on a table.

In an embodiment, the vibration noise of a z-axis LRA is altered based on device status, device noise information and ambient noise level information. Thus, a z-axis LRA may be used in a device, with the resulting benefits in cost and functionality, without causing excess noise under circumstances when such noise would otherwise be generated and would be expected to be objectionable.

With this overview in mind, and turning now to a more detailed discussion in conjunction with the attached figures, the techniques of the present disclosure are illustrated as being implemented in a suitable device environment. The following device description is based on embodiments and examples within which the disclosed principles may be implemented, and should not be taken as limiting the claims with regard to alternative embodiments that are not explicitly described herein. Thus, for example, while FIG. 1 illustrates an example portable electronic (computing) device with respect to which embodiments of the disclosed principles may be implemented, it will be appreciated that other device types may be used, including but not limited to laptop computers, tablet computers, and so on.

The schematic diagram of FIG. 1 shows an exemplary mobile device 110 forming part of an environment within which aspects of the present disclosure may be implemented. In particular, the schematic diagram illustrates a user device 110 including example components. It will be appreciated that additional or alternative components may be used in a given implementation depending upon user preference, component availability, price point and other considerations.

In the illustrated embodiment, the components of the user device 110 include a display screen 120, applications (e.g., programs) 130, a processor 140, a memory 150, one or more input components 160 such as RF input facilities or wired input facilities, including, for example one or more antennas and associated circuitry and logic. The antennas and associated circuitry may support any number of protocols, e.g., WiFi, Bluetooth, cellular, etc. The device 110 as illustrated also includes one or more output components 170 such as RF or wired output facilities. The RF output facilities may similarly support any number of protocols, e.g., WiFi, Bluetooth, cellular, etc. and may be the same as or overlapping with the associated input facilities. It will be appreciated that a single physical input may serve for both transmission and receipt.

The processor 140 can be any of a microprocessor, microcomputer, application-specific integrated circuit, or the like. For example, the processor 140 can be implemented by one or more microprocessors or controllers from any desired family or manufacturer. Similarly, the memory 150 is a nontransitory media that may reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device or system). Additionally or alternatively, the memory 150 may include a read only memory (i.e., a hard drive, flash memory or any other desired type of memory device).

The information that is stored by the memory 150 can include program code associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device 110. Such functions may include, for example, interaction among various internal components and storage and retrieval of applications and data to and from the memory 150.

These applications typically utilize the operating system to provide more specific functionality, such as file system service and handling of protected and unprotected data stored in the memory 150. Although many applications may provide standard or required functionality of the user device 110, in other cases applications provide optional or specialized functionality, and may be supplied by third party vendors or the device manufacturer.

With respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

In an embodiment, a power supply 190, such as a battery or fuel cell, is included for providing power to the device 110 and its components. Additionally or alternatively, the device 110 may be externally powered, e.g., by a vehicle battery or other power source. In the illustrated example, all or some of the internal components communicate with one another by way of one or more shared or dedicated internal communication links 195, such as an internal bus.

In an embodiment, the device 110 is programmed such that the processor 140 and memory 150 interact with the other components of the device 110 to perform a variety of functions. The processor 140 may include or implement various modules and execute programs for initiating different activities such as launching an application, transferring data and toggling through various graphical user interface objects (e.g., toggling through various display icons that are linked to executable applications).

Further, the illustrated device 110 includes a vibrator driver 180, as well as a vibrator 182. The vibrator 182 may be any available vibrator of suitable size and orientation, but in an embodiment, the vibrator 182 is an LRA vibrator aligned with the device z-axis (perpendicular to the device primary plane). The use of the LRA 182 will be discussed in detail below with respect to other figures, but the structure of the LRA may be typical. A typical LRA is actuated by an AC voltage that drives a voice coil linked to a moving mass on a spring. The mass and spring together have a resonant frequency, and when the voice coil is driven at that frequency, the entire vibrator vibrates perceptibly.

As noted above, the frequency and amplitude of a linear resonant actuator are decoupled, so that although the actuator is driven at or near its resonant frequency the amplitude of the resultant vibration may be altered by changing the applied current. Moreover, changing the driving frequency away from the resonant frequency will tend to reduce the amplitude of vibration for the same applied current magnitude, as the transfer efficiency drops. Although the frequency can be changed, the LRA will typically be operated within a narrow frequency range to optimize its power consumption—if the device is driven at the resonant frequency of the spring, it will consume less power to produce a vibration of equal magnitude. Regardless, this improvement alone presents a unique advantage over ERM motors: a precise waveform of varying intensity over time can be reproduced in an LRA with a fixed frequency, whereas a waveform of varying intensity in an ERM motor will also produce a varying frequency of vibration.

The typical start-up time for an LRA may be on the order of 10 ms, (as compared to 20-50 ms a typical ERM vibrator). Cessation of either type of vibrator can be had by applying an opposite voltage (in the case of an ERM) or a 180-degree phase-shifted voltage (in the case of an LRA). Using this method, an LRA may be stopped within about 10 ms. Thus, both the start and stop time of an LRA will be about 10 ms.

Figure 2:
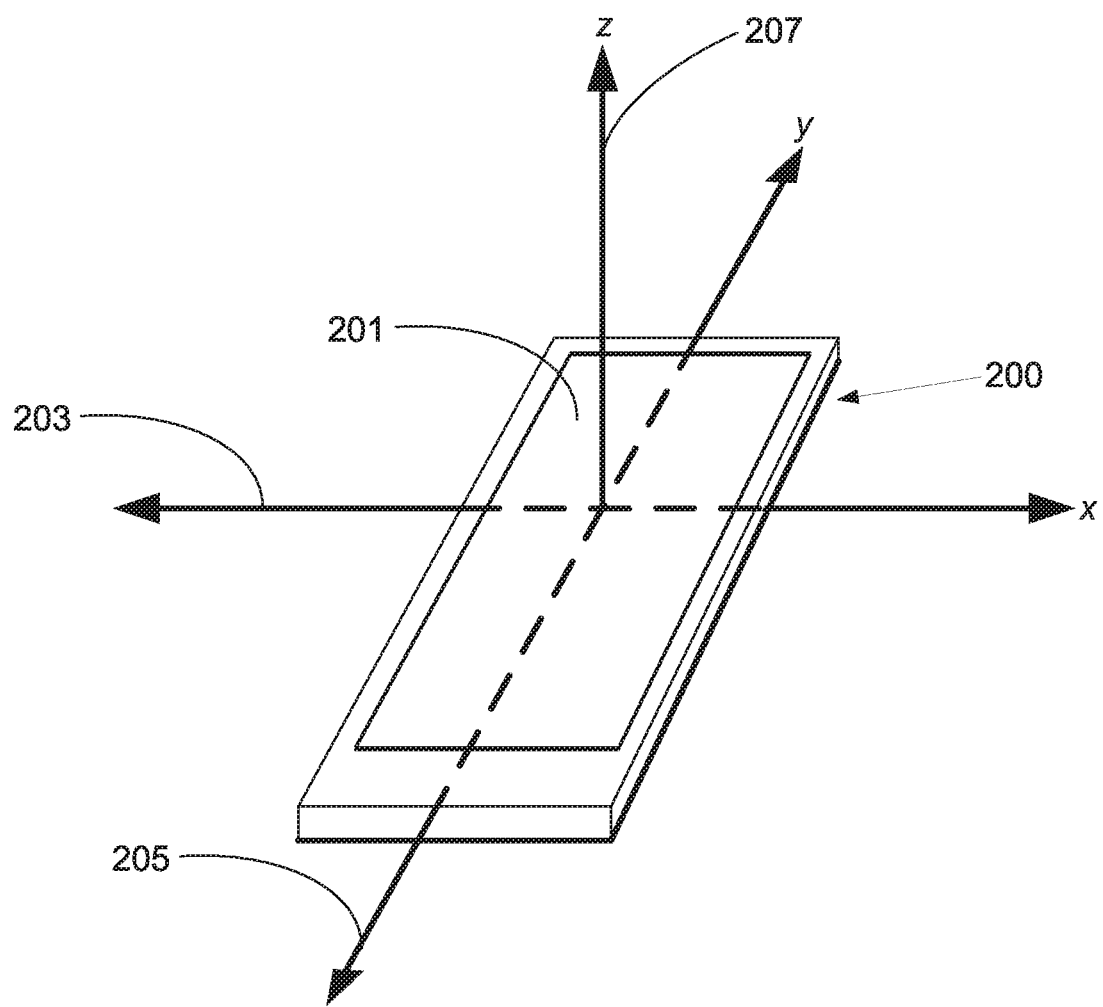
FIG. 2 is a simplified schematic of a portable electronic device within which one or more of the disclosed embodiments may be implemented.

FIG. 2 shows a simplified schematic of a portable electronic device 200 within which one or more of the disclosed embodiments may be implemented. The figure shows the device primary plane defined by the device x-axis 203 and device y-axis 205, and also shows the device z-axis 207 which is perpendicular to the device primary plane. The device display 201 is shown to indicate device orientation with respect to the defined axes.

Figure 3:
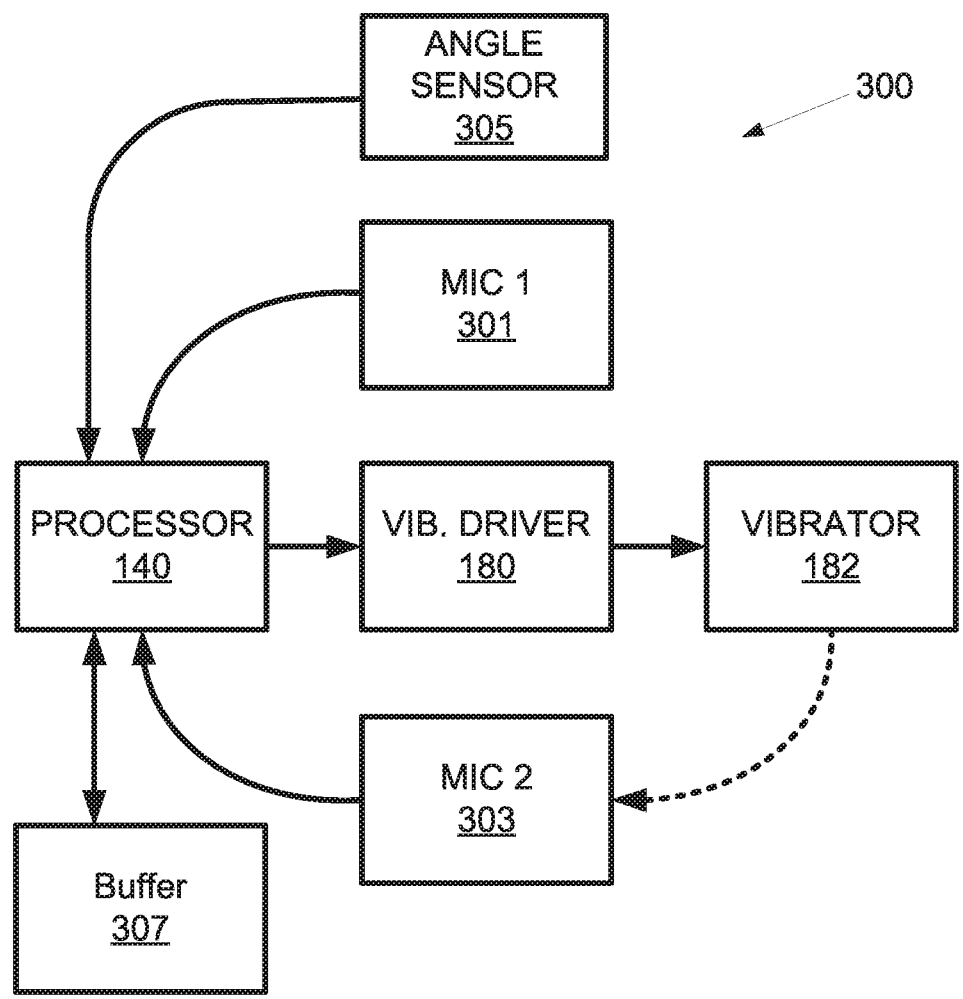
FIG. 3 is a logical diagram of a control loop for a z-axis vibrator in accordance with an embodiment of the disclosed principles.

Turning now to FIG. 3, this figure provides a logical diagram of an example control loop 300 for actuating a z-axis vibrator (FIG. 1, 182) in a portable electronic device such as device 110, 200 in accordance with an embodiment of the disclosed principles. In the illustrated embodiment, the device processor 140 is used to instruct the vibrator driver 180 as to the manner in which the vibrator 182 is to be driven. The instructions provided by the processor 140 will be described in greater detail in subsequent figures.

However, in overview, the goal of the control loop is to allow the vibration of the vibrator 182 to be heard or sensed without causing more noise than is needed. The processor 140 receives input from an ambient noise sensor (mic 1 (301)), which senses noise within the device environment, and from a vibration noise sensor (mic 2 (303)), which is located closer to the vibrator 182 than mic 1 (301) and which preferentially senses noise resulting from operation of the vibrator 182. This may include the rattling that may result when the device has been left on a hard surface. In addition, the processor 140 receives input from a device angle sensor 305 which is indicative of a device angle, e.g., flat, as when lying on a table, or otherwise. In an embodiment, the device is considered to be lying "flat" if its primary plane lies within 15 degrees of the horizontal plane, that is, the plane that is perpendicular to gravity Based on the received inputs, the processor 140 sets and adapts the instructions provided to the vibrator driver 180, e.g., the voltage and frequency at which the vibrator 182 is to be driven. The processor 140 may store this information to, and retrieve this information from, a buffer 307. The buffer 307 may be any suitable memory location and structure, and in an embodiment the buffer 307 is a timed buffer, holding values as valid until overwritten or until the expiration of a predetermined timeout period.

As an example of vibrator drive adjustment, if the device 110, 200 is in a pocket or backpack, the angle detection reading may be essentially any angle, and the ambient noise may be high or low, but if the vibration noise is low (e.g., no rattling on a surface), then the processor 140 may instruct the vibrator driver 180 to apply full power to the vibrator 182.

Similarly, if the device 110, 200 is in the user's hand, then again, the ambient noise and device angle will be non-determinative, and the vibration noise will again be low. Again in this case, the processor 140 may instruct the vibrator driver 180 to apply full power to the vibrator 182.

Now consider the case where the device has been placed on a flat hard surface such as a desk or table. In this case, the device angle will be flat, the ambient noise will be high or low, and the noise of vibration will likely be high. As such, the level of ambient noise will be determinative as to manner in which the vibrator 182 is driven. Thus, for example, if the ambient noise is high, then the noise of vibration may be allowed to remain high, meaning that the processor 140 may instruct the vibrator driver 180 to apply full power to the vibrator 182. In contrast, if the ambient noise is low, then it is not desirable to allow the noise of vibration to remain high, and the processor 140 may instruct the vibrator driver 180 to apply reduced power to the vibrator 182.

Finally, consider the case wherein the device is placed on a soft surface such as a jacket or blanket. In this case, the device angle will likely be flat and the ambient noise may be high or low, but the noise of vibration will be low. Thus, the processor 140 may instruct the vibrator driver to apply full power to the vibrator 182.

Figure 4:
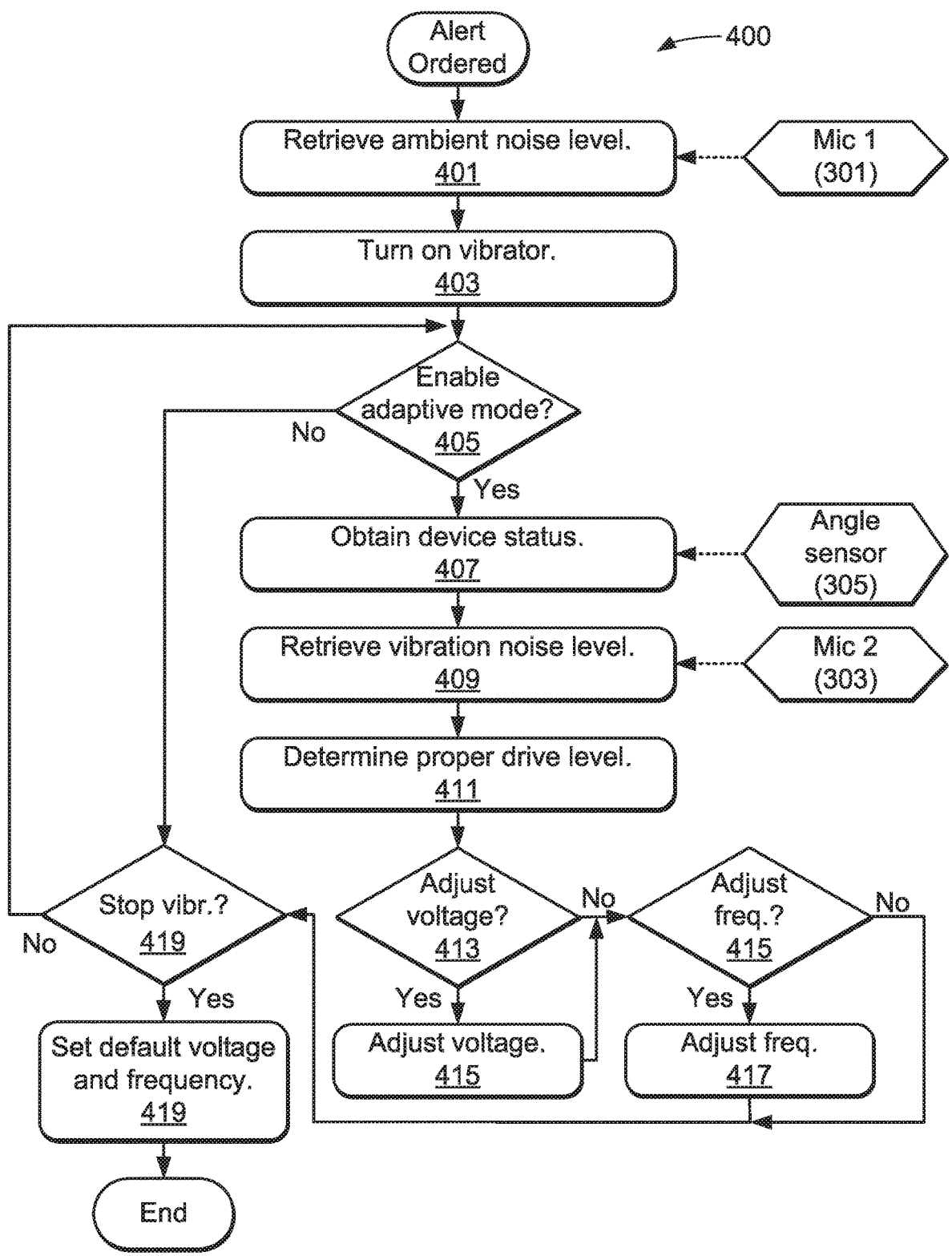
FIG. 4 is a flow chart of a process for adaptive vibrator control in accordance with an embodiment of the disclosed principles.
Figure 5:
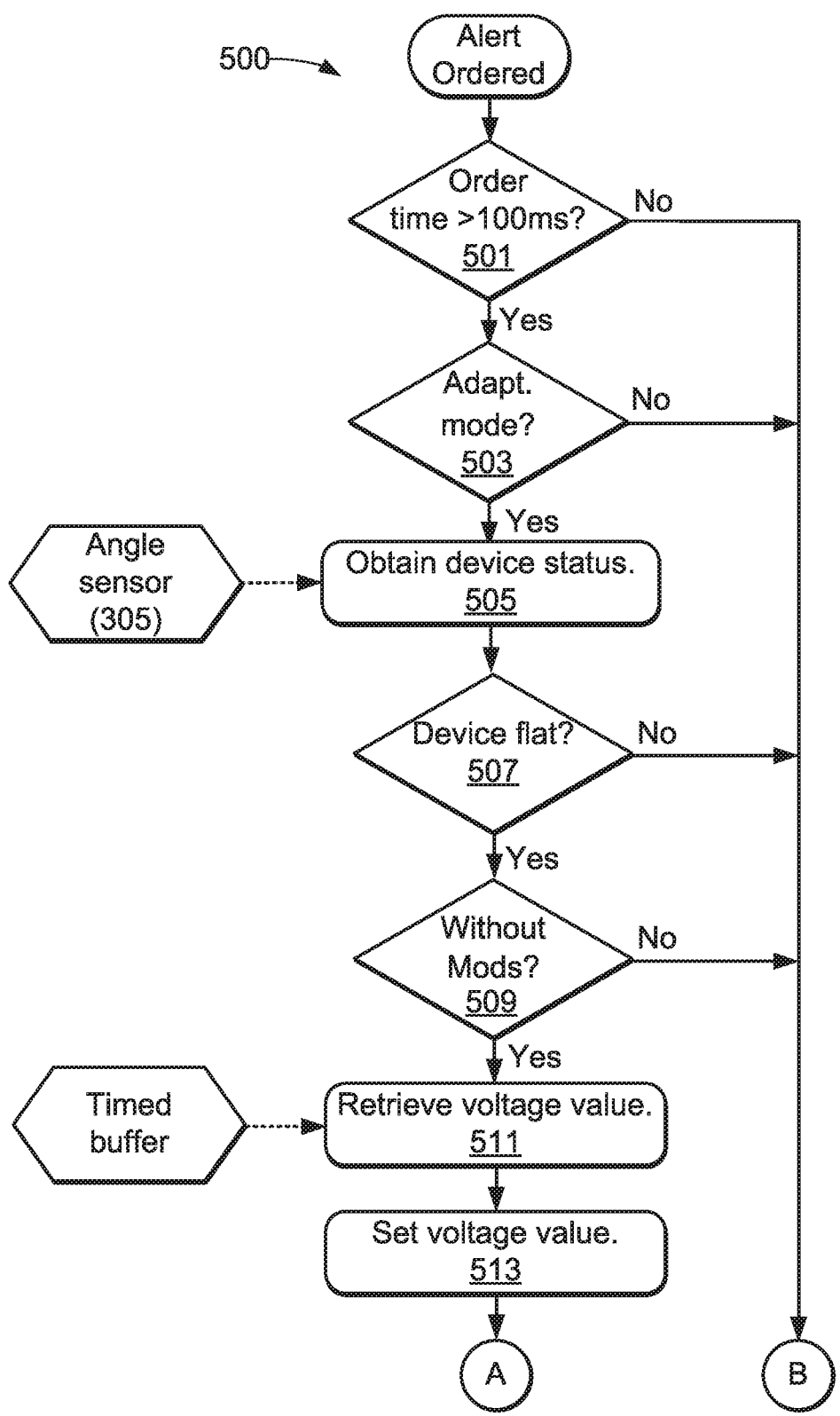
FIG. 5 is a flow chart of a process for adaptive vibrator control in accordance with an alternative embodiment of the disclosed principles.
Figure 6:
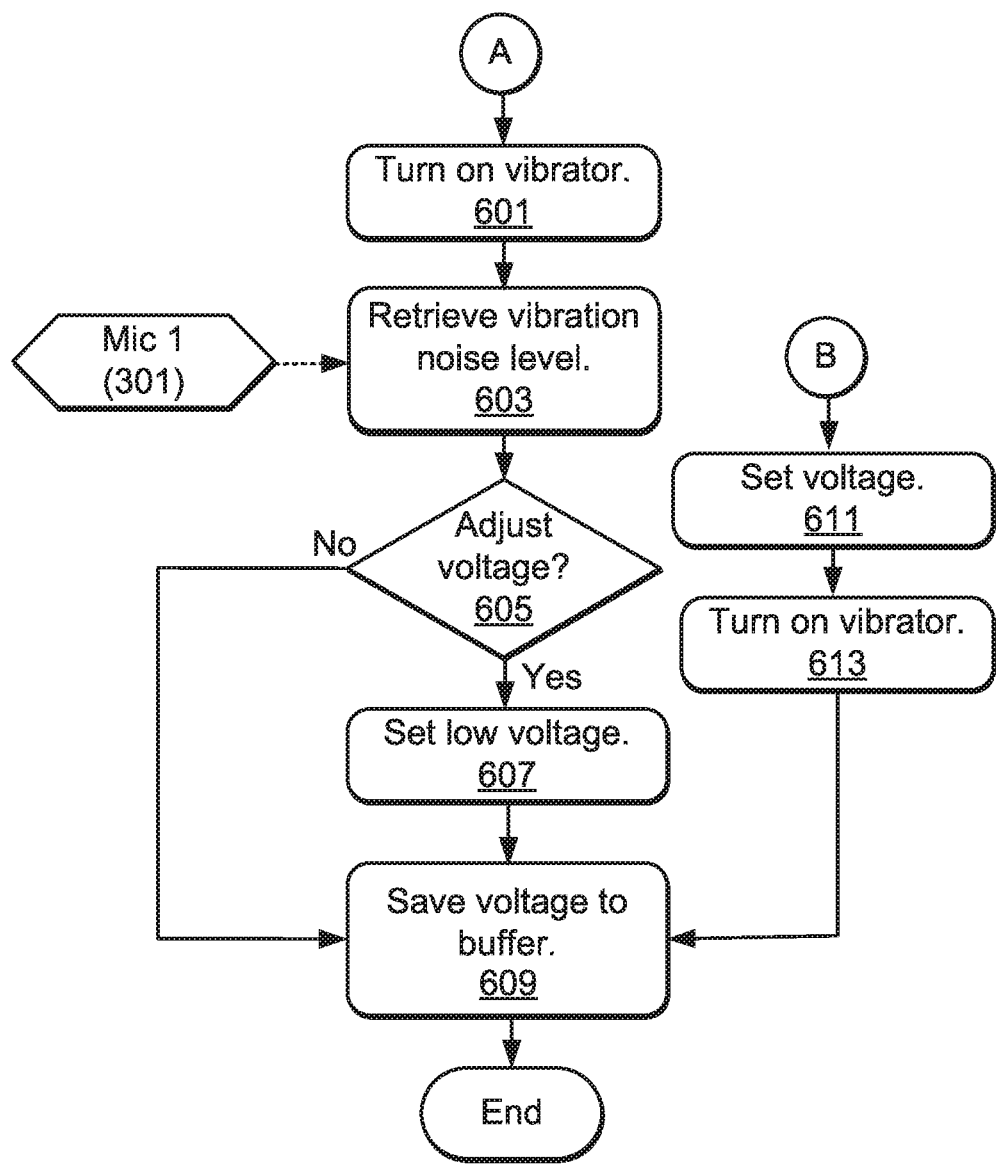
FIG. 6 is a flow chart which continues from the flow chart of FIG. 5.

The processes executed by the control loop 300 may be better understood by referring to FIGS. 4-6. In particular, FIG. 4 is a flow chart of a process for adaptive vibrator control in accordance with an embodiment of the disclosed principles, while FIGS. 5 and 6 show a flow chart of a process for adaptive vibrator control in accordance with an alternative embodiment. It will be appreciated that the features of either embodiment may be used in the other, and that these process flows are thus merely examples. For example, while the process shown in FIGS. 5 and 6 does not explicitly set out an ambient noise measurement as the process of FIG. 4 does, such a measurement can be used within the process of FIGS. 5 and 6 as well.

Turning first to FIG. 4, the illustrated process 400 begins when an alert is ordered, e.g., when an incoming message, call or email arrives or when a scheduled event requires an alert. All steps of the process 400 may be executed by the processor 140, e.g., by reading instructions from a non-transitory computer-readable medium, such as those identified with respect to FIG. 1 above, and executing those instructions.

At stage 401, the processor 140 retrieves the ambient noise level from the first noise sensor mic 1 (301), and turns on the vibrator at stage 403. At stage 405, the processor 140 determines whether the adaptive vibrator mode is to be used, and if so, the process 400 moves to stage 407, wherein the device status is obtained from the angle sensor 305. The device vibration noise is then retrieved from mic 2 (303) at stage 409 and at stage 411, the processor 140 determines an appropriate drive level based on the retrieved noise and status data. As noted above, for example, this may entail determining a high drive level if certain conditions are met and a low drive level if other conditions are met. Although two drive levels are described in these examples, it will be appreciated that a great number of levels may be used if desired.

Although FIG. 4 shows the use of two microphones to collect ambient noise levels and vibration noise levels respectively, a single microphone could be used before the alert to take an ambient level reading and during the alert to take a vibration level reading. In an alternative embodiment, filtering is used to separate ambient noise from vibration noise in a single measurement. The number of mics needed may depend on the location of the mic with respect to the vibrator. For example, in devices wherein a single mic is located as far as practicable from the vibrator, a second mic may be unnecessary. If it is determined at stage 413 that the voltage needs to be adjusted based on the determined appropriate voltage, the process flows to stage 415, wherein the processor adjusts the drive voltage downward (or upward) if needed. From stage 415 (or 413 if no voltage adjustment was needed), the processor determines at stage 415 whether a drive frequency adjustment is needed. This determination can again be based on the retrieved noise and status values, and a frequency adjustment, e.g., away from resonance, can serve to reduce vibration magnitude due to decreased coupling.

If a drive frequency adjustment is needed, the processor 140 makes the adjustment at stage 417, and regardless, the process 400 moves to stage 419, wherein the processor 140 determines whether the vibrator should be stopped. For example, the alert pulse may be over or the user may have performed an action, such as answering a call, to moot the alert. If the alert is to be stopped, the processor 140 restores the default voltage and frequency to those currently applied and exits. Otherwise, the process 400 returns to stage 404 to repeat the adaptive process while the alert remains valid.

Turning to FIG. 5, the process 500 illustrated in this figure shows certain alternative features that may be used as shown or in another embodiment such as that of FIG. 4. In FIG. 5, the process 500 begins with an alert ordered as with the process 400 of FIG. 4. At stage 501, the processor 140 determines whether the alert is to last for more than a predetermined time, such as 100 ms. If not, the process 500 flows to bridge B, which will be discussed with respect to FIG. 6. Otherwise, process 500 flows to stage 503 and it is determined whether the adaptive vibrator mode is to be used. For example, the user may have disabled the mode or it may be otherwise unavailable.

If the adaptive vibrator mode is not to be used, the process 500 again flows to bridge B. Otherwise, at stage 505, the processor 140 retrieves the device status, and at stage 507, determines whether the device is lying flat. In an embodiment, to prevent rapid fluctuations in detected device status due to vibration-induced motion, the processor applies hysteresis to the determination of device status. Thus, for example, if the device is determined at stage 507 to be lying flat, then the device status will be prevented from changing, regardless of sensed device angle, for a predetermined period of time, e.g., the duration of a vibration interval.

Continuing, if it is determined at stage 507 that the device is not lying flat, then the process 500 flows to bridge B, but it otherwise flows to stage 509, wherein it is determined whether the device includes any add-on modules or mods. Add-on modules are modules attached to the device that provide an additional function such as a camera function, sound function, etc., and such modules may cushion the back of the device, dampening vibration noise.

If an add-on module is present, the process 500 flows to bridge B, but it otherwise flows to stage 511, wherein the processor 140 retrieves a voltage to be applied to the vibrator. This information may be retrieved, for example, from a timed buffer that contains a value that is valid only for a predetermined amount of time. Regardless, the voltage value is then set at stage 513 and the process 500 flows to bridge A.

Continuing with process 500, FIG. 6 shows the processing that follows, in an embodiment, from bridges A and B. Starting at bridge A, the processor turns on the vibrator at stage 601 using the previously set voltage, and retrieves a corresponding vibration noise level at stage 603, e.g., via mic 1 (301). Based on the retrieved vibrator noise level, the processor 140 determines whether the vibrator voltage (which sets the vibration amplitude) should be adjusted, e.g., reduced to yield less noise.

If the voltage need not be adjusted, e.g., if the vibrator noise yielded by the initial voltage is suitable (see previous discussion of situations where high or low vibrator noise may be desired), then the process saves the voltage value to the timed buffer at stage 609 and exits. Otherwise, the processor sets a lower voltage at stage 607 to reduce vibrator noise before saving the value at stage 609 and exiting.

Returning to bridge B, which follows a negative decision at any of stages 501, 503, 507 and 509, the processor 140 sets the vibrator voltage to a default voltage at stage 611. Subsequently, the processor 140 turns on the vibrator at the default voltage at stage 613 before saving the default voltage to the timed buffer at stage 609 and exiting.

It will be appreciated that various systems and processes for vibrator control in portable electronic devices have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A portable electronic device configured to provide adaptive vibration noise reduction generating a user alert vibration of one of a first magnitude and a second magnitude, wherein the first magnitude is greater than the second magnitude and wherein the portable electronic device includes a vibrational actuator and is configured to alert a user by providing a first magnitude alert vibration via the vibrational actuator except when the portable electronic device is lying flat and an ambient noise level at the portable electronic device prior to the user alert vibration is low, and to provide a second magnitude alert vibration via the vibrational actuator when the portable electronic device is lying flat and the ambient noise level at the portable electronic device prior to the user alert vibration is low, wherein the portable electronic device is further configured to determine a vibrator noise level caused by the driven vibrational actuator during the user alert vibration, generate a modified drive level based on the ambient noise level at the portable electronic device and the vibrator noise level during the user alert vibration, the modified drive level corresponding to one of the first magnitude alert vibration and the second magnitude alert vibration, and drive the vibrational actuator with the modified drive level.

2. The portable electronic device in accordance with claim 1, further comprising a device housing, wherein the device housing defines a primary plane of the portable electronic device.

3. The portable electronic device in accordance with claim 2, wherein the portable electronic device is determined to be lying flat if its primary plane lies within 15 degrees of a horizontal plane perpendicular to gravity.

4. The portable electronic device in accordance with claim 1, wherein a processor is configured to generate the modified drive level by setting the modified drive level to the first magnitude alert vibration if the vibrator noise level is low or if the vibrator noise level is high but the ambient noise level at the portable electronic device during the user alert vibration is also high.

5. The portable electronic device in accordance with claim 4, wherein the processor is further configured to generate the modified drive level by setting the modified drive level to the second magnitude alert vibration if the vibrator noise level is high and the ambient noise level at the portable electronic device during the user alert vibration is low.

6. The portable electronic device in accordance with claim 1, further comprising an audio sensor and a processor, the processor being linked to the audio sensor and the vibrational actuator and being configured to sense the ambient noise level at the portable electronic device prior to the user alert vibration and drive the vibrational actuator at a predetermined drive level, wherein the predetermined drive level includes a predetermined drive frequency and wherein the processor is further configured to generate the modified drive level by determining a modified drive frequency.

7. The portable electronic device in accordance with claim 6, wherein the processor is further configured to retrieve the predetermined drive level from a timed buffer and write the modified drive level to the timed buffer.

8. The portable electronic device in accordance with claim 1, wherein a processor is further configured to determine whether the user alert vibration will last for less than a predetermined time period, and to apply a predetermined drive level without generating the modified drive level if it is determined that the user alert vibration will last for less than the predetermined time period.

9. The portable electronic device in accordance with claim 1, wherein the vibrational actuator is a single-axis vibrator.

10. The portable electronic device in accordance with claim 9, wherein the single-axis vibrator is a linear resonant actuator (LRA).

11. The portable electronic device in accordance with claim 10, wherein the single-axis vibrator includes multiple LRAs.

\* \* \* \* \*